United States Patent
Knoblauch

(10) Patent No.: US 9,541,121 B2
(45) Date of Patent: Jan. 10, 2017

(54) TRANSMISSION FOR AN ELECTRICALLY DRIVEABLE AXLE OF A MOTOR VEHICLE

(71) Applicant: Dr. Ing. h.c. F. Porsche Aktiengesellschaft, Stuttgart (DE)

(72) Inventor: Daniel Knoblauch, Ludwigsburg (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 0 days.

(21) Appl. No.: 14/224,314

(22) Filed: Mar. 25, 2014

(65) Prior Publication Data
US 2014/0295979 A1   Oct. 2, 2014

(30) Foreign Application Priority Data
Mar. 26, 2013  (DE) .................. 10 2013 103 107

(51) Int. Cl.
| | | |
|---|---|---|
| *F16H 3/08* | (2006.01) | |
| *F16C 3/02* | (2006.01) | |
| *B60K 1/00* | (2006.01) | |
| *B60K 1/02* | (2006.01) | |
| *B60K 17/22* | (2006.01) | |
| *F16D 3/06* | (2006.01) | |

(52) U.S. Cl.
CPC ............... *F16C 3/023* (2013.01); *B60K 1/00* (2013.01); *B60K 1/02* (2013.01); *B60K 17/22* (2013.01); *F16D 3/06* (2013.01); *B60K 2001/001* (2013.01)

(58) Field of Classification Search
CPC ....... B60K 1/02; B60K 2001/001; F16C 3/023
USPC ........... 464/182; 180/65.6; 74/665 D, 665 E, 74/421 A
See application file for complete search history.

(56) References Cited

U.S. PATENT DOCUMENTS

| | | | | |
|---|---|---|---|---|
| 2,090,066 | A | * | 8/1937 | Peterson ................ F16J 15/363 |
| 4,116,293 | A | | 9/1978 | Fukui |
| 5,435,794 | A | | 7/1995 | Mori et al. |
| 7,677,984 | B2 | * | 3/2010 | Hahn et al. ................... 464/182 |
| 7,870,917 | B2 | * | 1/2011 | Akagi et al. ............. 180/65.6 X |
| 7,882,759 | B2 | * | 2/2011 | Schwendemann ..... H02K 7/081 |
| 8,678,118 | B2 | * | 3/2014 | Takenaka et al. ........... 180/65.6 |
| 2010/0240464 | A1 | * | 9/2010 | Schafer et al. ............... 464/182 |
| 2012/0304790 | A1 | * | 12/2012 | Bologna | |

* cited by examiner

*Primary Examiner* — Gregory Binda
(74) *Attorney, Agent, or Firm* — Gerald E. Hespos; Michael J. Porco; Matthew T. Hespos

(57) ABSTRACT

A transmission (3) for an electrically driveable axle (1) of a motor vehicle has a drive input shaft (4) that can be driven by at least one electric machine (2, 12), for driving the axle (1) of the motor vehicle. The drive input shaft (4) is a hollow shaft with radially internal toothing (13) and can receive an electric machine coupling shaft (21) that can be inserted into the hollow shaft (4). The hollow shaft (4) has radially external toothing (22) that interacts with the radially internal toothing (13). A transmission of said type can be used universally, specifically for electric machines with different rotor shafts and/or for one or two electric machines.

7 Claims, 4 Drawing Sheets

TRANSMISSION FOR AN ELECTRICALLY DRIVEABLE AXLE OF A MOTOR VEHICLE

CROSS REFERENCE TO RELATED APPLICATION

This application claims priority under 35 USC 119 to German Patent Appl. No. 10 2013 103 107.2 filed on Mar. 26, 2013, the entire disclosure of which is incorporated herein by reference.

BACKGROUND

1. Field of the Invention

The invention relates to a transmission for an electrically driveable axle of a motor vehicle. The transmission has a drive input shaft that can be driven by at least one electric machine for driving the axle of the motor vehicle.

2. Description of the Related Art

A known transmission for a motor vehicle has a drive input shaft that is rotationally conjointly connected to at least one rotor shaft of at least one electric machine so that the one or more electric machines can drive the drive input shaft of the transmission. The input shaft may drive an intermediate shaft, which in turn drives an output shaft. The output may be connected via articulated shafts to two wheels of the axle of a motor vehicle.

It is an object of the invention to make a transmission of the type mentioned above universally usable for electric machines with differently designed rotor shafts and/or for one or two electric machines.

SUMMARY OF THE INVENTION

The invention relates to a transmission for an electrically driveable axle of a motor vehicle where the drive input shaft of the transmission is hollow and has radially internal toothing. The drive input shaft of the transmission receives an electric machine coupling shaft that can be inserted into the hollow shaft and that is provided with a radially external toothing to interact with the radially internal toothing of the hollow shaft.

The coupling shaft is easily exchangeable and, depending on the design of the coupling shaft, it is possible for a single electric machine or two electric machines to interact with the coupling shaft, even though the respective electric machine may have a specific design of the rotor shaft for connecting to the coupling shaft.

The coupling shaft may be relatively short and an end of the coupling shaft facing away from the external toothing may interact with a single electric machine. However, the coupling shaft also may be relatively long and each end may interact with a separate electric machine. Use of a relatively short or a relatively long coupling shaft depends on the number of electric machines to be placed in operative connection with the coupling shaft. The coupling shaft should be designed in accordance the design and outer diameter of the toothing of the rotor shaft of the electric with which the coupling shaft is to interact.

Fixing means are preferably provided for axially fixing the coupling shaft in its inserted position in the hollow shaft. The fixing means preferably comprises detent in regions of the external toothing of the coupling shaft and the internal toothing of the hollow shaft. The coupling shaft and hollow shaft are locked in a defined insertion position of the coupling shaft when the coupling shaft is inserted into the hollow shaft. The coupling shaft can be pulled out of the hollow shaft by applying an elevated axial force.

The transmission of the invention requires only minimal modification or adaptation outlay if a different number of electric machines, and/or electric machines with differently designed rotor shafts, are to be coupled to the transmission, because the transmission has a coupling shaft which interacts with the drive input shaft.

One or both ends of the coupling shaft may be coupled to one or more rotor shafts of one or more electric machines via a spline toothing.

Radial shaft sealing rings preferably are provided for sealing off the drive input shaft in an oil-tight manner with respect to the housing of the transmission. The radial shaft sealing rings seal off radially toward the inside against the drive input shaft and/or against the coupling shaft. Thus, the coupling shaft can be exchanged easily without leaks in the transmission and without the possibility of oil escaping. By contrast, if the radial shaft sealing rings are seated directly on the coupling shaft and not on the drive input shaft, it is possible, due to the relatively small shaft diameter of the coupling shaft and thus the low power losses, to realize particularly high rotational speeds of the coupling shaft and thus of the electric machine or electric machines. It is however a disadvantage that, during the exchange of the coupling shaft, the transmission is open and thus oil can escape.

The transmission preferably has an intermediate shaft that can be driven by the drive input shaft, and to have a drive output shaft that can be driven by the intermediate shaft and that drives the axle of the motor vehicle.

The drive input shaft preferably is mounted in a housing of the transmission on one or on both sides of the internal toothing of the drive input shaft and the external toothing, with the external shaft being engaged with toothing of the intermediate shaft.

The housing of the transmission preferably has diametrically arranged openings for the sealed-off leadthrough of a relatively long coupling shaft. If only a relatively short coupling shaft is used, the coupling shaft extends through only one of the two openings, and the other opening is closed off by a cover.

Further features of the invention will emerge from the appended drawing and from the description of the preferred exemplary embodiments depicted in the drawings, without the invention being restricted to these.

DETAILED DESCRIPTION OF THE PREFERRED EMBODIMENTS

Figure 1:
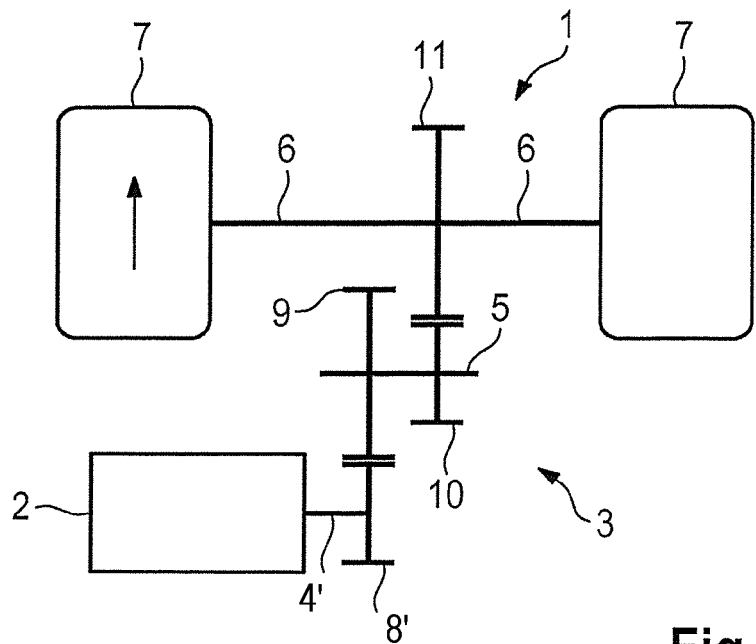
FIG. 1 shows a prior art drivetrain of an axle of a motor vehicle where the axle can be driven by a single electric machine via a summing transmission.

FIG. 1 shows the basic design of a prior art drivetrain of an electrically driveable axle 1 of a motor vehicle. The axle 1 is driven by a single electric machine 2 that interacts with a transmission 3. The transmission 3 has a drive input shaft 4' that can be driven by the electric machine 2, an intermediate shaft 5 that can be driven by the drive input shaft 4', and a drive output shaft 6 that can be driven by the intermediate shaft 5 to drive the axle 1 of the motor vehicle. For this purpose, the drive output shaft 6 is connected via articulated shafts to two wheels 7 of the axle 1 of the motor vehicle.

The transmission 3 is a summing transmission. A gearwheel 8'—pinion—connected rotationally conjointly to the drive input shaft 4' meshes with a gearwheel 9 connected rotationally conjointly to the intermediate shaft 5. Another gearwheel 10 is connected rotationally conjointly to the intermediate shaft 5 and meshes with a gearwheel 11 connected rotationally conjointly to the drive output shaft 6. The gearwheels are spur gears.

Figure 2:
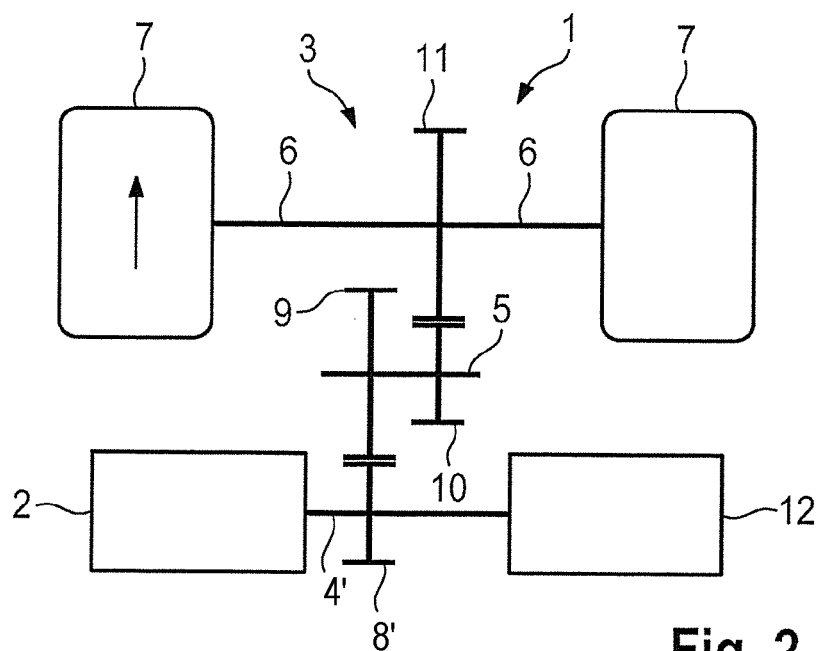
FIG. 2 shows a prior art arrangement similar to FIG. 1, but with the axle being driven by means of two electric machines.

The prior art drivetrain of FIG. 1 has a single electric machine 2 for driving the drive input shaft 4'. FIG. 2 shows a prior art drivetrain with two electric machines 2 and 12 for driving the drive input shaft 4'. The electric machines 2 and 12 are arranged on the opposite sides of the gearwheel 8'.

Figure 1A:
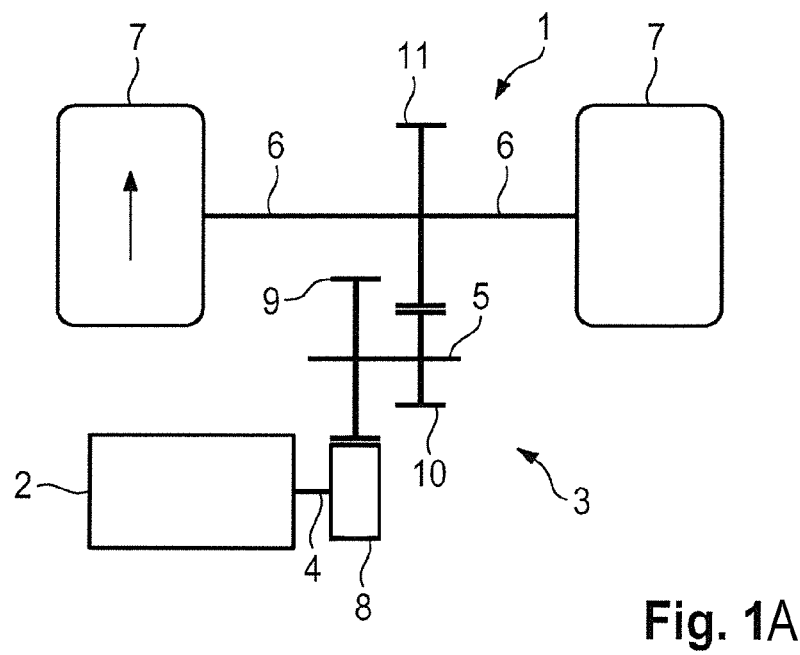
FIG. 1A shows the drive train of FIG. 1, but with a schematic depiction of a drive input shaft according to the invention.
Figure 3:
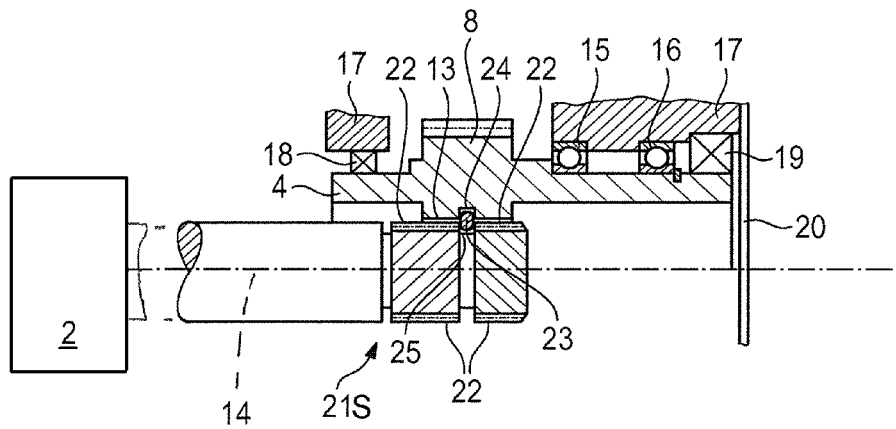
FIG. 3 shows a first embodiment of a transmission according to the invention in the region of the drive input shaft that is illustrated schematically in FIG. 1A and of a relatively short coupling shaft that is connected rotationally conjointly to the drive input shaft for connection of a single electric machine.

A first embodiment of the invention has a transmission 3 with a hollow drive input shaft 4, as shown in FIG. 3. The drive input shaft 4 is of unitary construction and has a gearwheel 8 radially on the outside that engages the gearwheel 9 of the intermediate shaft, as shown in FIG. 1A, and further has toothing 13 radially on the inside in the region of the gearwheel 8. The axis of rotation of the drive input shaft 4 is indicated by the dashed line 14. One end of the drive input shaft 4 is mounted in two spaced-apart rolling bearings 15 and 16 in a housing 17 of the transmission. Opposite free ends of the drive input shaft 4 are sealed off against the housing 17 by radial shaft sealing rings 18 and 19.

The hollow drive input shaft 14 is open at both ends. The open right end drive input shaft 14 in FIG. 3 is covered by a cover 20 which is mounted in the housing 17.

A relatively short coupling shaft 21S is inserted into the end of the drive input shaft 4 opposite the cover 20. The forward end of the coupling shaft 21S in the direction of insertion has a radially external toothing 22. In this way, a transmission-specific spline toothing is formed between the coupling shaft 21S, which is rotatable about the axis of rotation 14, and the hollow drive input shaft 4. The transmission-specific spline toothing forms a uniform interface for all applications, including the embodiment of FIG. 4.

A snap ring 23 is engaged in an encircling internal groove 24 of the drive input shaft 4 and into a complementary external encircling groove 25 of the coupling shaft 21. The coupling shaft 21S can be driven by the electric machine 2. The axis of rotation of the rotor shaft of the electric machine 2 coincides with the axis of rotation 14 of the drive input shaft 4. The connection of the electric machine 2 to the coupling shaft 21S is realized via a motor-specific spline toothing or interface that is not illustrated.

Figure 2A:
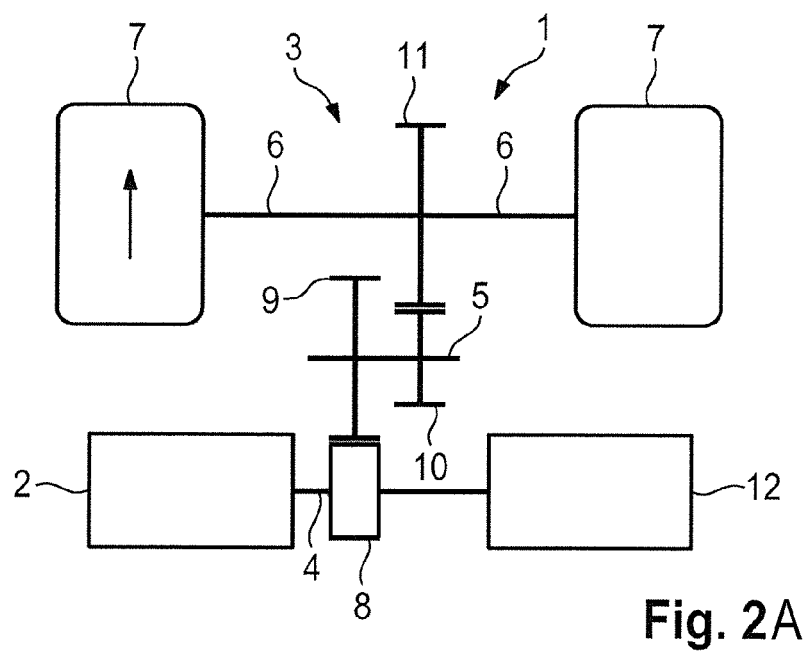
FIG. 2A shows the drive train of FIG. 2, but with a schematic depiction of a drive input shaft according to the invention.
Figure 4:
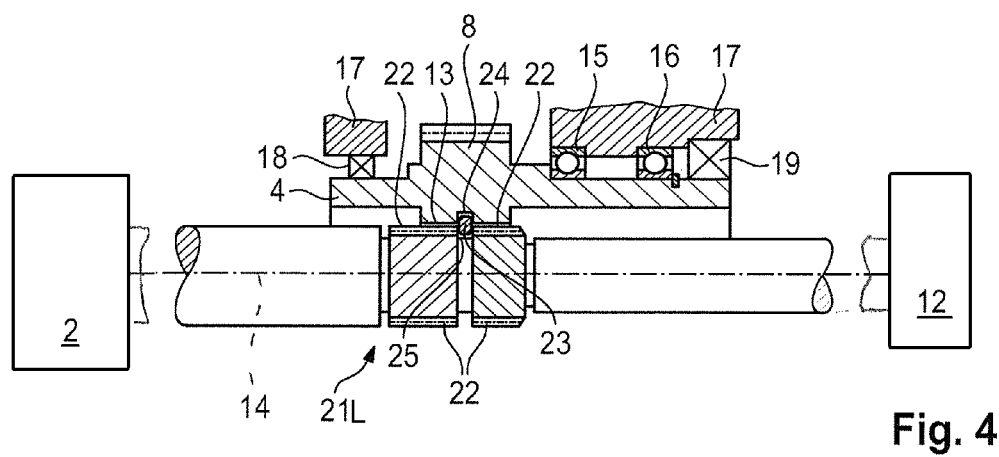
FIG. 4 shows a second embodiment of a transmission according to the invention in the region of the drive input shaft that is illustrated schematically in FIG. 2A and of a relatively long coupling shaft that is connected rotationally conjointly to the drive input shaft and for connection of two electric machines.

The embodiment as per FIG. 4 differs from FIG. 3 in that the cover 20 has been removed from the housing 17 and a relatively long coupling shaft 21L has been led out of the drive input shaft 4 through the opening and has been connected rotationally conjointly to a second electric machine 12 in a manner corresponding to the connection of coupling shaft 21L to the electric machine 2. The drive input shaft 4 has a gearwheel 8 radially on the outside that engages the gearwheel 9 of the intermediate shaft, as shown in FIG. 2A, and further has toothing 13 radially on the inside in the region of the gearwheel 8. FIG. 4 also illustrates that the region of the coupling shaft 21L assigned to the electric machine 2 has a larger diameter than the region assigned to the electric machine 12. It is thus possible to use differently configured coupling shafts 21L which share a transmission-specific spline toothing or interface for all applications, and thus share a design that is uniform in this regard.

The transmission 3 is sealed off by the radial shaft sealing rings 18 and 19 that bear radially at the outside against the housing 17 and radially at the inside against the drive input shaft 4. Thus, the coupling shaft 21L can be exchanged easily without leaks occurring in the transmission 3, and without oil escaping.

The drive input shaft 4 can be mounted on both sides of the gearwheel 8.

Figure 5:
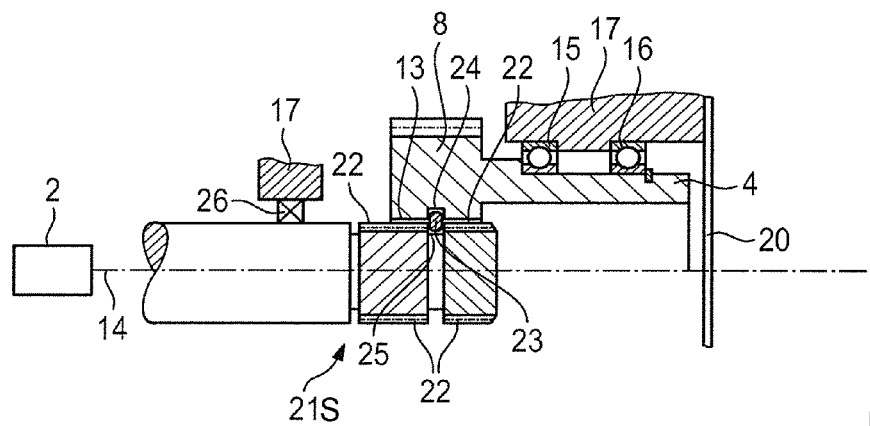
FIG. 5 shows a third embodiment of a transmission according to the invention in the region of the drive input shaft that is illustrated schematically in FIG. 1A and of a relatively short coupling shaft that is connected rotationally conjointly to the drive input shaft and for connection of a single electric machine.

The embodiment of FIG. 5 differs from FIG. 3 merely in that the drive input shaft 4 is not sealed off by the radial shaft sealing rings 18 and 19 against the housing 17 of the transmission 3, but instead, said sealing is realized directly between the housing 17 and the coupling shaft 21S by a radial shaft sealing ring 26. In this case, the end of the drive input shaft 4 facing toward the electric machine 2 is shorter. The sealing-off directly against the coupling shaft 21S enables higher rotational speeds of the coupling shaft and thus of the electric machine 2. However, during an exchange of the coupling shaft 21S, the transmission 3 is open, and oil can escape.

Figure 6:
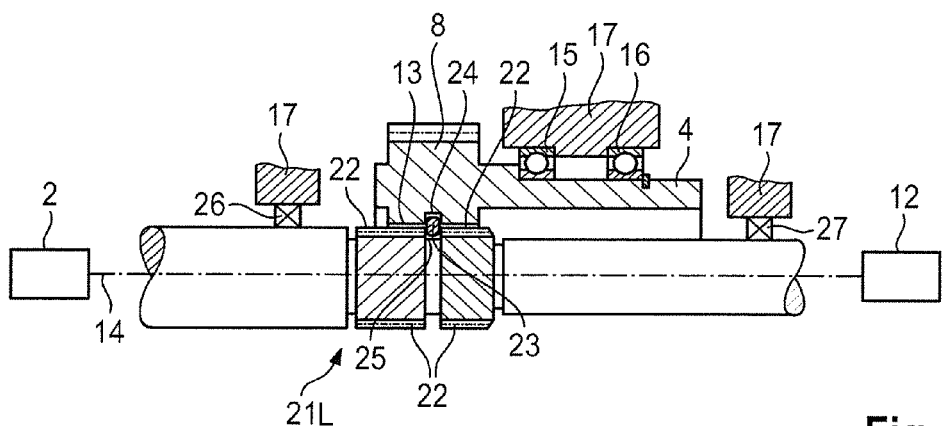
FIG. 6 shows a fourth embodiment of the transmission according to the invention in the region of the drive input shaft that is illustrated schematically in FIG. 2A and of a relatively long coupling shaft connected rotationally conjointly to the drive input shaft and for the connection of two electric machines.

FIG. 6 differs from FIG. 5 in that a relatively long coupling shaft 21L is used, and has opposite ends connected respectively to the electric machine 2 and 12. In this variant, a further radial shaft sealing ring 27 seals off the housing 17 against the coupling shaft 21L on the of the drive input shaft 4 that faces toward the electric machine 12.

What is claimed is:

1. A transmission for transmitting a rotational driving force to an electrically driveable axle of a motor vehicle, the transmission comprising:
   a hollow drive input shaft having opposite open first and second ends and radially internal toothing between the ends, the hollow drive input shaft further having a radially external gearwheel formed with external toothing thereon at a position radially outward from the radially internal toothing;
   an intermediate shaft having radially external toothing engaged with the radially external gearwheel of the hollow drive input shaft for transmitting rotation of the hollow drive input shaft to the axle of the motor vehicle;

a housing sealingly engaged with the hollow drive input shaft at positions between the external toothing and the first and second ends of the hollow drive input shaft;

first and second driving force inputs each of which is selectively engageable with the hollow drive input shaft for delivering a rotatable driving force to the electrically drivable axle of the motor vehicle, wherein:

the first driving force input comprises: a first electric machine, a first coupling shaft having a first end coupled to the first electric machine, a second end within the hollow drive input shaft and external toothing engaged with the internal toothing of the hollow drive input shaft to deliver a rotational driving force from the first electric machine, and a cover mounted to the housing at a position opposed to the second end of the hollow drive input shaft and to the second end of the first coupling shaft; and the second driving force input comprises the first electric machine, a second electric machine, a second coupling shaft having a first end coupled to the first electric machine, a second end external of the hollow drive input shaft and coupled to the second electric machine, and external toothing engaged with the internal toothing of the hollow drive input shaft to deliver a rotational driving force from the first and second electric machines, whereby the transmission is reconfigurable for delivering the rotatable driving force only from the first electric machine or from the first and second electric machines.

2. The transmission of claim 1, further comprising a fixing device for axially fixing the first coupling shaft or the second coupling shaft in the hollow drive input shaft.

3. The transmission of claim 2, wherein the fixing device comprises at least one snap ring arranged in proximity to the external toothing of the first or the second coupling shaft and the internal toothing of the hollow drive input shaft.

4. The transmission of claim 1, wherein the first and second electric machines are differently configured and the first and second ends of the second coupling shaft are dimensioned differently to interact with the differently configured first and second electric machines.

5. The transmission of claim 1, further comprising radial shaft sealing rings mounted on an outer circumferential surface of the hollow drive input shaft for sealing off the hollow drive input shaft in an oil-tight manner with respect to the housing of the transmission.

6. The transmission of claim 1, wherein the hollow drive input shaft is of unitary construction.

7. The transmission of claim 1, wherein the first end of the first coupling shaft is configured based on characteristics of the first electric machine, the hollow drive input shaft and the external toothing of the first coupling shaft each having a specified configuration regardless of the characteristics of the first electric machine.

* * * * *